United States Patent
Schaer et al.

(10) Patent No.: US 12,370,663 B2
(45) Date of Patent: Jul. 29, 2025

(54) METHOD FOR OPERATING A HAND-GUIDED MACHINE TOOL, AND HAND-HELD MACHINE TOOL

(71) Applicant: Hilti Aktiengesellschaft, Schaan (LI)

(72) Inventors: Roland Schaer, Grabs (CH); Michael Wierer, Roethis (AT); Manuel Knobel, Ludesch (AT)

(73) Assignee: ArcelorMittal, Luxembourg (LU)

( * ) Notice: Subject to any disclaimer, the term of this patent is extended or adjusted under 35 U.S.C. 154(b) by 6 days.

(21) Appl. No.: 17/641,537

(22) PCT Filed: Mar. 9, 2020

(86) PCT No.: PCT/EP2020/056159
§ 371 (c)(1),
(2) Date: Mar. 9, 2022

(87) PCT Pub. No.: WO2021/052634
PCT Pub. Date: Mar. 25, 2021

(65) Prior Publication Data
US 2022/0324092 A1 Oct. 13, 2022

(30) Foreign Application Priority Data
Sep. 20, 2019 (EP) ..................... 19198570

(51) Int. Cl.
*B23B 49/00* (2006.01)
*B23Q 9/00* (2006.01)
(Continued)

(52) U.S. Cl.
CPC .............. *B25F 5/00* (2013.01); *B23Q 17/10* (2013.01); *B23Q 2717/00* (2013.01)

(58) Field of Classification Search
CPC ...... B23B 49/00; B23Q 9/0071; B23Q 16/00; B23Q 17/22; B23Q 2716/00
See application file for complete search history.

(56) References Cited

U.S. PATENT DOCUMENTS 5,584,619 A    12/1996  Guzella
5,787,377 A *  7/1998  Watanabe ......... B60R 21/01558
                                                    280/735
(Continued)

FOREIGN PATENT DOCUMENTS

CN    1256383 A    6/2000
CN    1349873 A    5/2002
(Continued)

OTHER PUBLICATIONS

International Search Report of PCT/EP2020/056159, dated Jul. 7, 2020.

*Primary Examiner* — Thanh K Truong
*Assistant Examiner* — Patrick B Fry
(74) *Attorney, Agent, or Firm* — Davidson Kappel LLC (57) ABSTRACT

A method for operating a hand-guided machine tool. The method contains detecting at least one linear acceleration value by means of the at least one sensor apparatus (6); subtracting the gravitational acceleration from the at least one linear acceleration value to form an adjusted linear acceleration value; integrating the adjusted linear acceleration value into a speed value; integrating the speed value into a distance value; multiplying the speed value by a time constant to form at least one further distance value; adding the distance value to the further distance value to form at least one total distance value; filtering at least one of the linear acceleration values and/or at least one of the speed values; comparing the total distance value with a defined limit value; and initiating a predefined action when the total distance value exceeds the defined limit value. A hand-held machine tool for carrying out such a method is also described.

20 Claims, 6 Drawing Sheets

(51) Int. Cl.
  *B23Q 16/00*  (2006.01)
  *B23Q 17/10*  (2006.01)
  *B23Q 17/22*  (2006.01)
  *B25F 5/00*  (2006.01)

(56) References Cited

U.S. PATENT DOCUMENTS

| | | | |
|---|---|---|---|
| 6,111,515 A | | 8/2000 | Schaer et al. |
| 7,182,148 B1* | | 2/2007 | Szieff ................ B25H 1/0078 |
| | | | 173/171 |
| 8,260,452 B2* | | 9/2012 | Austin ............. G05B 19/41805 |
| | | | 702/95 |
| 9,557,157 B2* | | 1/2017 | Ihlenfeldt ................ G01C 3/08 |
| 9,579,783 B2 | | 2/2017 | Wirnitzer et al. |
| 10,661,423 B2* | | 5/2020 | Schlegel ................ B25D 17/08 |
| 10,883,660 B2* | | 1/2021 | Nishimiya ................ F16P 3/00 |
| 10,940,573 B2* | | 3/2021 | Shao ........................ G01S 17/08 |
| 11,015,759 B2* | | 5/2021 | Sun ............................ F16P 3/00 |
| 2004/0011632 A1 | | 1/2004 | Hellmann et al. |
| 2012/0279742 A1 | | 11/2012 | Roser et al. |
| 2014/0066816 A1* | | 3/2014 | McNames ............ A61B 5/6831 |
| | | | 600/595 |
| 2016/0089757 A1 | | 3/2016 | Wirnitzer et al. |
| 2016/0167186 A1* | | 6/2016 | Chan ................... G05B 19/4185 |
| | | | 173/2 |
| 2017/0036315 A1 | | 2/2017 | Wirnitzer et al. |
| 2017/0129091 A1* | | 5/2017 | Schlegel ................ B25D 16/00 |
| 2018/0043521 A1 | | 2/2018 | Moessnang et al. |
| 2019/0128474 A1 | | 5/2019 | Sun et al. |
| 2019/0283196 A1* | | 9/2019 | Shao ........................ G01S 17/87 |

FOREIGN PATENT DOCUMENTS

| | | |
|---|---|---|
| CN | 102007010800 A1 | 9/2008 |
| CN | 102574282 A | 7/2012 |
| CN | 103218061 A | 7/2013 |
| CN | 105459033 A | 4/2016 |
| CN | 106457546 A | 2/2017 |
| CN | 107000186 A | 8/2017 |
| CN | 207027419 U | 2/2018 |
| CN | 108453675 A | 8/2018 |
| CN | 108942806 A | 12/2018 |
| CN | 109765048 A | 5/2019 |
| DE | 4344817 A1 | 6/1995 |
| DE | 19628945 A1 | 5/1997 |
| DE | 102013200602 A1 | 7/2014 |
| DE | 102013211997 A1 | 1/2015 |
| EP | 0771619 A2 | 5/1997 |

* cited by examiner

METHOD FOR OPERATING A HAND-GUIDED MACHINE TOOL, AND HAND-HELD MACHINE TOOL

The present invention relates to a method for operating a hand-guided machine tool, such as a grinder and/or cutting-off machine, in particular an angle grinder, a circular saw, jigsaw or saber saw, drill, hammer drill, chiseling hammer drill or the like, wherein the hand-guided machine tool can be connected to a tool which is moved, for example, in a rotating or linear manner or the like, for example a cutting disc, a saw blade or the like, and contains a drive for driving the tool, a control device and at least one sensor for detecting linear acceleration values and rotational angle speed values.

Furthermore, the present invention relates to a hand-held machine tool for carrying out the method.

SUMMARY OF THE INVENTION

When using hand-held machine tools or hand-guided machine tools, for example angle grinders, saws or the like, there is a risk that the tool driven by the hand-held machine tool, for example a cutting disc of an angle grinder or a saw blade of a saw, will suddenly jam during the machining of a material, such as concrete. As a result of this, the hand-held machine tool can carry out uncontrolled and very rapid movements which can injure the user.

It is an object of the present invention to provide a method for operating a hand-guided machine tool, by means of which method a rapid movement of the hand-guided machine tool is reliably detected and the risk of injury to a user of the hand-held machine tool and damage to the hand-held machine tool can be reduced. Another object of the present invention is that of providing a hand-held machine tool for carrying out the method.

The present invention provides a method for operating a hand-guided machine tool which can be connected to a tool, with a drive for driving the tool, a control device and at least one sensor apparatus being provided, the sensor apparatus being designed to detect at least one linear acceleration value and in particular at least one rotational angle speed value, the at least one sensor apparatus having a distance from a reference point associated with the machine tool or the tool that is greater than or equal to zero.

According to the invention, the method contains the following method steps:
- detecting at least one linear acceleration value by means of the at least one sensor apparatus;
- subtracting the gravitational acceleration from the at least one linear acceleration value to form at least one adjusted linear acceleration value;
- integrating the at least one adjusted linear acceleration value into at least one speed value;
- integrating the at least one speed value into at least one distance value;
- multiplying the at least one speed value by a time constant to form at least one further distance value;
- adding the at least one distance value to the at least one further distance value to form at least one total distance value;
- filtering at least one of the linear acceleration values and/or at least one of the speed values;
- comparing the at least one total distance value with a defined limit value;
- initiating a predefined action when the at least one total distance value exceeds the defined limit value.

By means of the method according to the invention, a rapid movement of the reference point of the hand-guided machine tool can be determined in a simple and reliable manner, which movement is generated, for example, by the tool being stuck or jammed in a workpiece to be machined. Due to the very quick and timely initiation of a corresponding predefined action, a user can be protected in a simple manner against injury from a sudden acceleration of the hand-guided machine tool.

By means of the method according to the invention, a position of the reference point is calculated proceeding from the current position by a defined time into the future and the predefined action is initiated if the reference point would be at a distance greater than a defined limit value from the current position. In particular, an algorithm is therefore provided that calculates a position of the reference point assuming framework conditions which are constant over a certain time.

By filtering the values, an unwanted initiation of the predefined action can be prevented in a simple manner, such that vibrations occurring during operation of the hand-guided machine tool, for example, do not lead to the initiation of the predefined action.

The sensor apparatus has, for example, an acceleration sensor for determining linear acceleration values and/or a gyro sensor for determining rotational rate values, wherein one or both sensor apparatuses can, in particular, be arranged directly in the reference point. As an alternative to this, at least one sensor apparatus and, for example, both sensor apparatuses are arranged so as to be spaced apart from the reference point. A single sensor apparatus can be provided which combines the functionality of an acceleration sensor and a gyro sensor.

The reference point can be chosen as desired, it being useful, in particular, to arrange it in the region of a working axis or a working point of the machine tool or in a handle region of the machine tool.

In an advantageous embodiment of the present invention, at least one rotational rate value is determined by at least one sensor apparatus, the rotational rate value being multiplied by a value which corresponds to the distance of the sensor apparatus from the reference point, the determined value being used to determine the total distance value and in particular being added to the speed values generated from the linear acceleration values. In this way, an entire movement of a reference point in one spatial direction can also be determined precisely when the sensor apparatus is arranged so as to be spaced apart from the reference point, since rotating the machine tool also has an influence on the movement of the reference point.

In order to be able to determine a movement of the hand-held machine tool not only in one spatial direction, but also in two and particularly advantageously in three spatial directions, linear acceleration values and/or rotational rate values are determined by the at least one sensor apparatus in at least two, in particular three, spatial directions. In this way, a movement of the hand-guided machine tool in space can be monitored in a simple manner.

In order to be able to easily subtract the gravitational acceleration from the at least one linear acceleration value to form at least one adjusted linear acceleration value, in an advantageous embodiment of the present invention, an idle state of the machine tool in space is determined when a vector sum of the three linear acceleration values is within a defined range of 8 m/s$^2$ to 12 m/s$^2$, for example. Alternatively, to reduce computing power, a dot product of the linear acceleration values can be used.

As an alternative or in addition to this, an idle state of the hand-guided machine tool can be determined on the basis of the three rotational rate values, an idle state being determined, for example, when a dot product of the three rotational rate values is less than a defined limit value of 4000 rad$^2$/s$^2$, in particular less than approximately 2000 rad$^2$/s$^2$, for example.

In particular, it is provided that an idle state of the hand-guided machine tool is determined if this is determined both on the basis of the acceleration values and on the basis of the rotational rate values. Alternatively, a state of motion of the hand-guided machine tool, i.e. a state of the hand-guided machine tool not in the idle state, can be determined if either the linear acceleration values or the rotational rate values do not determine an idle state.

In an advantageous embodiment of a method according to the invention, a position of the machine tool when the machine tool is in motion, i.e. in particular if an idle state of the machine tool is not determined on the basis of the criteria described above, is determined based on adding integrated rotational rate signals to the position of the machine tool in the idle state. In turn, the position of the machine tool is preferably determined on the basis of the linear acceleration values if an idle state of the machine tool is determined again at a later point in time.

It has proven to be particularly advantageous for rapidly detecting a deflection of the machine tool if the time constant has a value between 5 ms and 150 ms, in particular of approximately 70 ms.

In order to limit or preferably completely exclude disruptions which occur during the operation of the machine tool, at least one rotational rate value and/or at least one linear acceleration value can be filtered in order to block frequency values which are below a predetermined frequency threshold value and/or above a further frequency threshold value. For example, this makes it possible for minor movements of the hand-guided machine tool that are not caused by a stuck tool to be disregarded for the method.

The filter can be a high-pass filter, a low-pass filter or a band-limited filter. In order to reliably avoid undesirably exceeding the limit value, for example due to disruptions, it has proven to be advantageous if a band-limited filter is used for both the acceleration values and for the speed values, with limit frequencies preferably being approximately 0.5 Hz and 10 Hz, respectively. The values can be filtered in each case before or after the speed values generated from the linear acceleration values are combined with the speed values calculated from the rotational rate values.

Particularly good results can be achieved if a band-limited filter is used for the linear acceleration values and a high-pass filter is used for the rotational rate values or a band-limited filter of the speed values is used before or after a combination of the signals.

Effective protection of a user against injury can be achieved if the predefined action corresponds to switching off the drive. Interrupting the drive can, for example, prevent a torque generated by the drive from being transmitted to the housing and then to a user of the hand-held machine tool. The machine tool can be designed even more safely if the predefined action corresponds to actively braking the drive, such that the tool comes to a standstill particularly quickly. Active braking can further reduce possible risk to a user of the machine tool. As an alternative or in addition to this, it can also be provided that the predefined action corresponds to sending out a warning signal and/or outputting a signal on a display apparatus.

Furthermore, the present invention provides a hand-held machine tool which can be connected to a tool, with a drive for driving the tool, a control device and at least one sensor apparatus being provided, the sensor apparatus being designed to detect at least one linear acceleration value and in particular at least one rotational angle speed value, the at least one sensor apparatus having a distance from a reference point associated with the machine tool or the tool that is greater than or equal to zero, and the hand-held machine tool being designed to carry out the method described in more detail above.

The advantages stated for the method according to the invention also apply accordingly to a hand-held machine tool designed according to the invention. By using a hand-held machine tool designed according to the invention, injury to a user can thus be prevented in a simple and reliable manner.

In order, for example, to be able to disregard minor movements of the hand-held machine tool that are not caused by a stuck tool or disruptions, such as vibrations, for the method, at least one filter apparatus for blocking frequency values which are below a predetermined frequency threshold value and/or at least one filter apparatus for blocking frequency values which are above a predetermined frequency threshold value can be provided.

In a particularly simple hand-held machine tool according to the invention, the sensor apparatus comprises an acceleration sensor for determining linear acceleration values, in particular in three spatial directions, and a gyro sensor for determining rotational rate values in the three spatial directions.

BRIEF DESCRIPTION OF THE DRAWINGS

Further advantages can be found in the following description of the drawings. Various embodiments of the present invention are shown in the drawings. The drawings, the description and the claims contain numerous features in combination. A person skilled in the art will expediently also consider the features individually and combine them to form meaningful further combinations.

In the drawings, identical and equivalent components are provided with the same reference signs. In the drawings.

DETAILED DESCRIPTION

Figure 1:
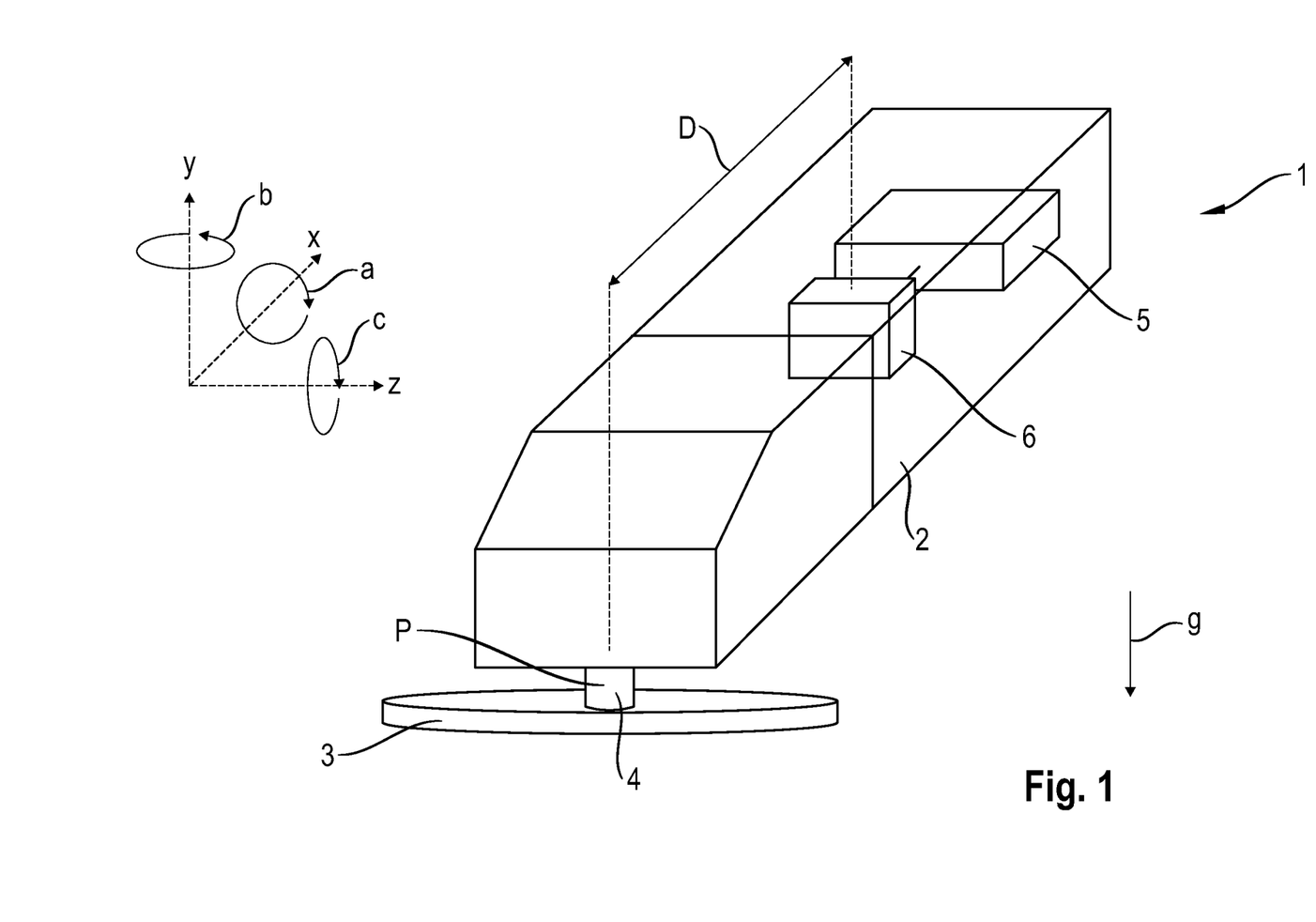
FIG. 1 schematically shows a hand-held machine tool designed as an angle grinder in a perspective view.

FIG. 1 shows a hand-held machine tool 1 or a hand-guided machine tool according to the invention which is designed as an angle grinder in the illustration shown. According to an alternative embodiment, the hand-held machine tool 1 can also be designed as a drill, as a hammer drill, as a chiseling hammer drill or as a saw, such as a circular saw, a jigsaw, a saber saw or the like.

The hand-held machine tool 1 designed as an angle grinder in the figures has a housing 2 and a tool 3, for example designed as a cutting disc. The housing 2 preferably has at least one holding region at which a user can hold and guide the hand-held machine tool 1 using one or both hands. The tool 3 can be actuated by a drive which can be supplied with current in particular by means of an accumulator which can be connected to the hand-held machine tool 1. According to an alternative embodiment, the hand-held machine tool 1 can also be supplied with electrical current from a network by means of a power cable.

Figure 3:
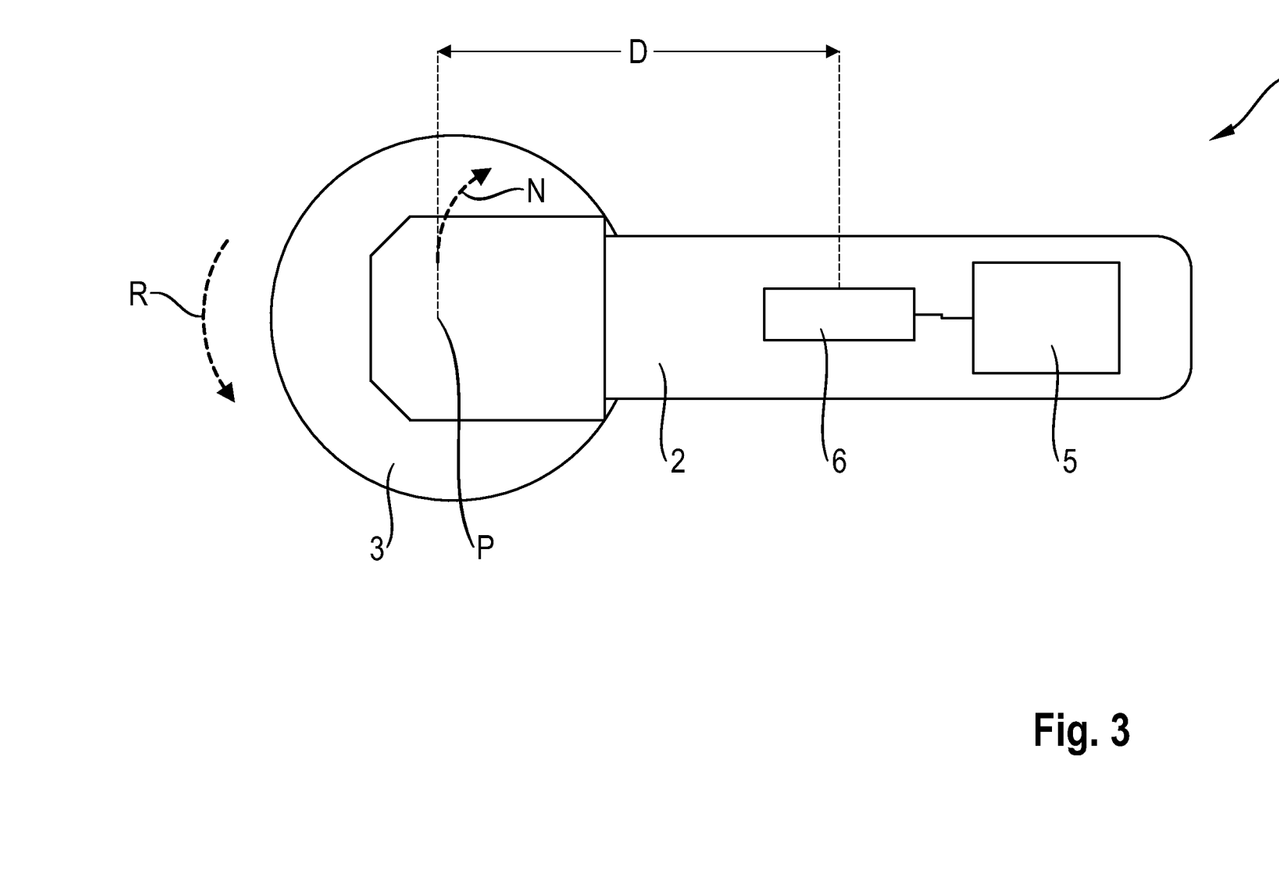
FIG. 3 schematically shows the angle grinder according to FIGS. 1 and 2 in plan view.

The drive for actuating the tool 3 in a rotating, axial, gyrating or similar movement is arranged in the interior of the housing 2 along with a gear mechanism and a drive shaft 4. The drive, for example an electric motor, the gear mechanism and the drive shaft 4 are arranged in the housing 2 with respect to one another and connected to one another in such a way that a torque generated by the electric motor can be transmitted to the gear mechanism and finally to the drive shaft 4. A freely rotating end of the drive shaft 4 that projects downward on the housing 2 is connected to the cutting disc 3. The torque of the drive shaft 4 can thus be transmitted to the cutting disc 3, such that the cutting disc 3—as shown in FIG. 3—can rotate in the direction of the arrow R. The drive which is designed as an electric motor, the gear mechanism and the majority of the drive shaft 4 are not shown in the drawings.

The hand-held machine tool 1 also has a control device 5 and a sensor apparatus 6. The sensor apparatus 6 is connected to the control device 5 electrically or alternatively wirelessly, for example via radio. Signals can be sent between the sensor apparatus 6 and the control device 5. The control device 5 is in turn connected to the electric motor and the accumulator electrically or alternatively wirelessly, for example via radio. Signals can be sent between the sensor apparatus 6 and the electric motor and the accumulator. The control device 5 is used, inter alia, for open-loop and closed-loop control of the drive and the power supply of the hand-held machine tool 1.

In the present case, a single sensor apparatus 6 is provided. In an alternative embodiment, different sensor apparatuses can also be provided. In the present case, the sensor apparatus 6 is used to simultaneously detect six individual measurement values. In the present case, the sensor apparatus 6 is designed as a combined acceleration and/or gyro sensor. In alternative embodiments, it may also be the case that only one acceleration sensor or a separate acceleration sensor and a gyro sensor are provided, it being possible for the sensors in the last embodiment to be arranged at different locations of the machine tool 1.

In the present case, the sensor apparatus 6 is designed to detect a first linear acceleration value $a_x$ in a direction x, a second linear acceleration value $a_y$ in a direction y and a third linear acceleration value $a_z$ in a direction z. Furthermore, the sensor apparatus 6 is designed to detect a first rotational rate value or rotational speed value $\omega_x$ in the rotational direction a about the rotational axis x, a second rotational rate value or rotational speed value $\omega_y$ in the rotational direction b about the rotational axis y and a third rotational rate value or rotational speed value $\omega_z$ in the rotational direction c about the rotational axis z.

If the tool 3 designed as a cutting disc remains stuck in a material to be machined, for example concrete, while working with the hand-held machine tool 1 and therefore the tool 3 no longer rotates relative to the material, the torque generated by the electric motor now acts on the housing 2 of the hand-held machine tool 1. As a result, the housing 2 begins to accelerate in the rotational direction N or counter to the rotational direction b. Such a sudden acceleration or sudden swing of the housing 2 of the hand-held machine tool 1 can be dangerous for a user.

In order to prevent a rotating disk from injuring the user or others, the control device 5 switches the electric motor off as quickly as possible when a sudden acceleration or sudden swing of the housing 2 of the hand-held machine tool 1 is detected with the aid of the values detected by sensor apparatus 6 and an algorithm which is stored in the control device 5 and is described by the method according to the invention.

A rotational axis of the tool 3 is defined here as the reference point P for which the respective present values are determined. In alternative embodiments and also in other types of hand-held machine tools, different reference points can be defined.

Figure 2:
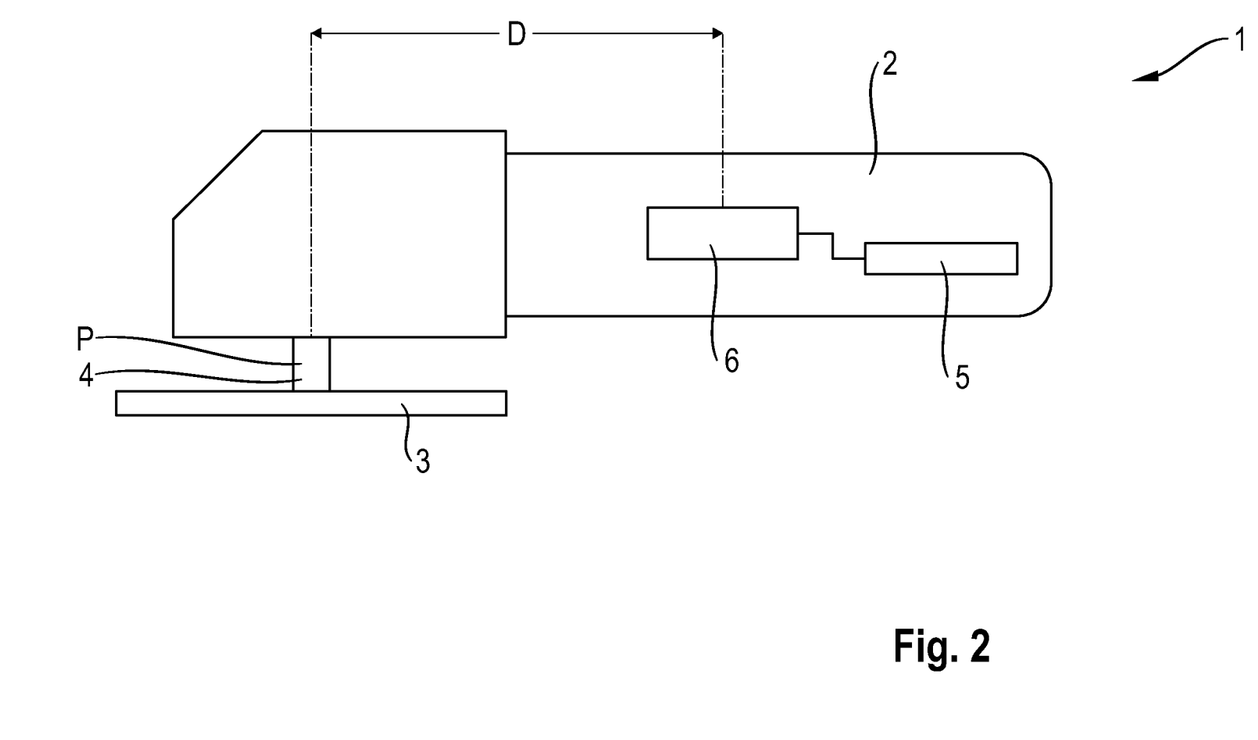
FIG. 2 schematically shows the angle grinder according to FIG. 1 in a side view.

As can be seen from FIGS. 1 to 3, the sensor apparatus 6 in the present case is positioned, considered substantially in the longitudinal direction x of the hand-held machine tool 1, in the center of the housing 2 of the hand-held machine tool 1. In the present case, the reference point P thus has a distance D or $r_D$ from the sensor apparatus 6 in the longitudinal direction x of the hand-held machine tool 1.

Figure 4:
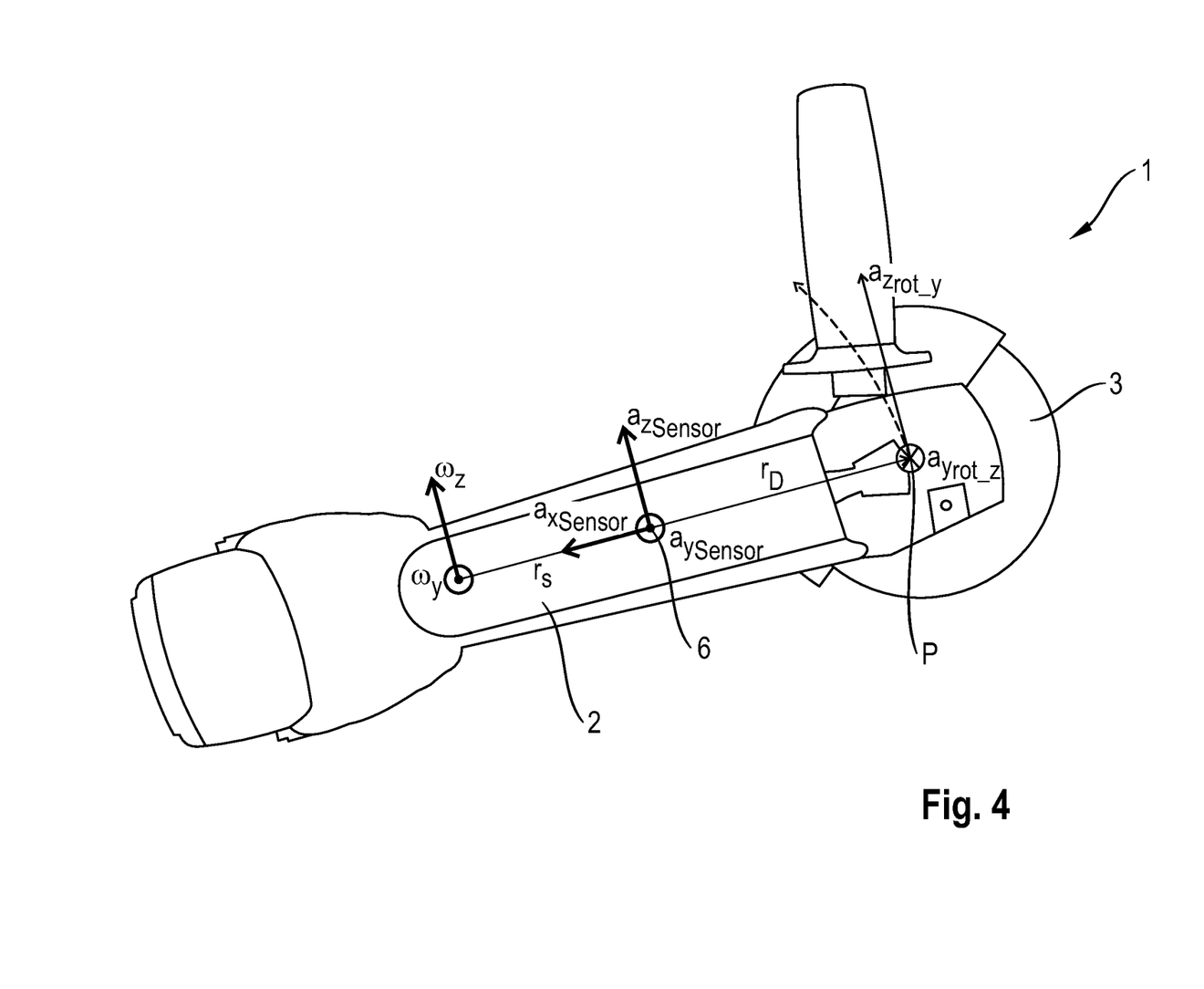
FIG. 4 is a simplified plan view of an alternative embodiment of a hand-held machine tool designed as an angle grinder, in which linear acceleration values and rotational rate values which can be determined by a sensor apparatus are visible.

In the embodiment according to FIG. 4, the sensor apparatus 6 for determining the linear acceleration values $a_x$, $a_y$, and $a_x$ is arranged at a first distance $r_D$ from the reference point P and a further sensor apparatus for determining the rotational rate values $\omega_x$, $\omega_y$, and $\omega_z$ is arranged at a distance $r_D+r_S$ from the reference point P.

In a further alternative embodiment of the invention, it can be provided that a distance between the reference point P and the sensor apparatus 6 is equal to zero and the sensor apparatus 6 is thus arranged in the reference point P.

A method is first described below which is applied when the sensor apparatus 6 is arranged in the reference point P.

The sensor apparatus 6 detects a first linear acceleration value $a_x$ in a direction x, a second linear acceleration value $a_y$ in a direction y and a third linear acceleration value $a_z$ in a direction z. The directions x, y and z are in each case perpendicular to one another, the x direction corresponding, for example, to the longitudinal direction of the hand-held machine tool 1, the y direction corresponding to a vertical direction of the hand-held machine tool 1 and the z direction corresponding to a transverse direction of the hand-held machine tool 1.

The first, second and third linear acceleration value $a_x$, $a_y$, $a_z$ is detected after the drive of the hand-held machine tool 1 has been activated and a torque is transmitted to the tool 3 designed as a cutting disc.

The gravitational acceleration (g=9.81 m/s$^2$) which is additionally detected by the sensor apparatus 6 acts permanently on the hand-held machine tool 1. Since this is disruptive for determining a critical state of the hand-held machine tool 1, the relevant component of the gravitational acceleration value g is deducted from the first, second and third linear acceleration value $a_x$, $a_y$, $a_z$ and thereby a fourth, fifth and sixth acceleration value $a_{xcorr}$, $a_{ykorr}$, $a_{zkorr}$ is determined.

In order to be able to subtract the gravitational acceleration from the linear acceleration values $a_x$, $a_y$, $a_z$, for example in a vector calculation, it is necessary to know the position or orientation of the hand-held machine tool 1 in free space.

In the idle state of the hand-held machine tool 1, the orientation of the hand-held machine tool 1 in free space is determined directly by the linear acceleration values $a_x$, $a_y$, $a_z$ which are detected by the sensor apparatus 6. In this case, the only acceleration value which can be detected by the sensor apparatus 6 is the gravitational acceleration value g. Because the gravitational acceleration is directed substantially to the center of the earth, the control device 5 can be used to determine the orientation or position of the hand-held machine tool 1 in free space in relation to the direction in which the gravitational acceleration acts.

A state in which a sum of the three linear acceleration values $a_x$, $a_y$, $a_z$ lies within a defined range of from 8 m/s$^2$ to 12 m/s$^2$, for example, is defined as the idle state of the hand-held machine tool 1. Alternatively, in order to reduce computing power, a dot product of the linear acceleration values $a_x$, $a_y$, $a_z$ can be used together with a correspondingly adjusted range.

As an alternative or in particular in addition to this, an idle state of the hand-held machine tool 1 can be determined on the basis of rotational rate values $\omega_x$, $\omega_y$ and $\omega_z$ which are determined by the sensor apparatus 6, an idle state being determined, for example, when a dot product of the three rotational rate values is less than a defined limit value of 4000 rad$^2$/s$^2$, in particular less than approximately 2000 rad$^2$/s$^2$, for example.

If an idle state of the hand-held machine tool 1 is not detected, a position of the hand-held machine tool 1 is determined on the basis of adding integrated rotational rate signals $\omega_x$, $\omega_y$ and $\omega_z$ to the position of the hand-held machine tool 1 in the last determined idle state. Such a determination of the position of the hand-held machine tool 1 is continued until the hand-held machine tool 1 is again determined to be in an idle state. The position of the hand-held machine tool 1 is then determined again on the basis of the linear acceleration values $a_x$, $a_y$, $a_z$.

In the next step, the fourth, fifth and sixth corrected acceleration value $a_{xkorr}$, $a_{ykorr}$, $a_{zkorr}$ are integrated into a first, second and third speed value or linear speed value.

The first, second and third speed value are subsequently integrated and a first, second and third distance value are determined.

In particular in parallel with this, the first, second and third speed value are multiplied by a time constant $\tau$ and a fourth, fifth and sixth distance value are determined. The time constant can be a fixed period of time between 10 ms and 100 ms, in particular of approximately 70 ms.

Finally, the first, second, third, fourth, fifth and sixth distance values are added to determine a total distance value.

Figure 5:
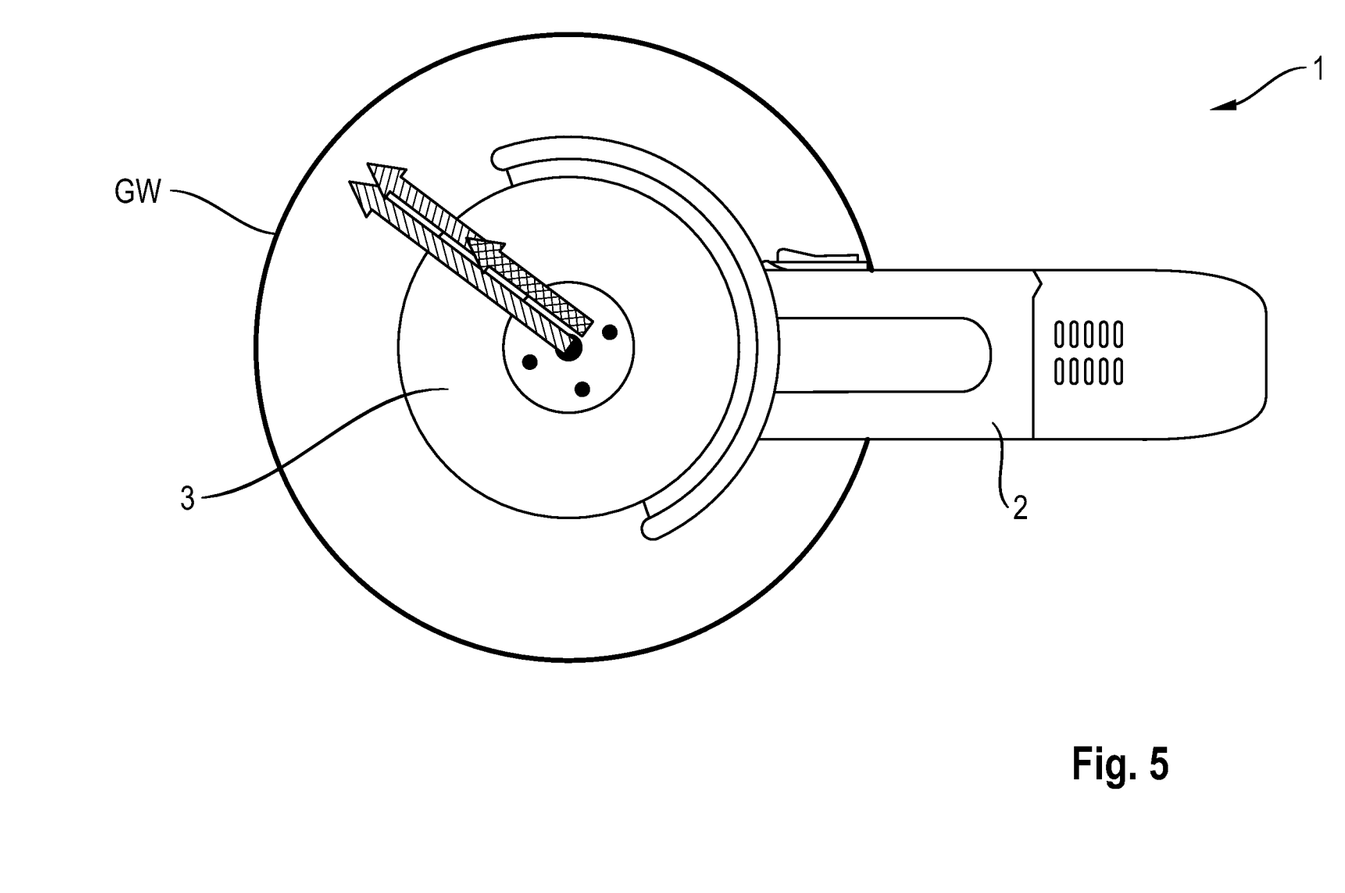
FIG. 5 is a further simplified view of a hand-held machine tool designed as an angle grinder.

By means of the control device 5, a predefined action is initiated if the total distance value exceeds a predetermined limit value GW. This is shown in simplified form in FIG. 5, in which the predefined limit value GW is shown schematically in an axis in the form of a circle about the drive axis of the tool 3, the predefined action being initiated if the position of the reference point P that is predicted by the control device 6 at a defined point in time lies outside the circle GW. When considering all three spatial axes x, y and z, the predefined limit value GW could represent a sphere, for example. It can be provided that the limit values in the three spatial axes x, y and z differ from one another.

If the predefined limit value GW is exceeded, the drive of the hand-held machine tool 1 is braked by the control device 5, in particular by sending out a corresponding signal to the drive. Braking the drive prevents the tool 3 rotating here from injuring a user of the hand-held machine tool 1.

In an embodiment in which the sensor apparatus 6 is arranged so as to be spaced apart from the reference point P, the rotational rate values or signals $\omega_x$, $\omega_y$ and $\omega_z$ are also used, in addition to the method described above, to also have an effect on a possible rotation of the hand-held machine tool 1 at the reference point P.

The rotational rate values $\omega_x$, $\omega_y$ and $\omega_z$ are detected by the sensor apparatus 6. The first rotational rate value $\omega_x$ is the rotational speed at which the hand-held machine tool 1 rotates about the rotational axis x in the rotational direction a. The second rotational rate value $\omega_y$ is the rotational speed at which the hand-held machine tool 1 rotates about the rotational axis y in the rotational direction b. The third rotational rate value $\omega_z$ is the rotational speed at which the hand-held machine tool 1 rotates about the rotational axis z in the rotational direction c. It is of course also possible that the hand-held machine tool 1 can rotate counter to the rotational direction a, b or c.

In the present case, the reference point P lies in the center of the cutting disc 3 and thus in the sensor axis x, such that the rotational rate values $\omega_x$ need not be taken into account for calculating the respective distance values $s_x$, $s_y$ and $s_z$. The position of the reference point P is determined by means of a double integration of the accelerations added to an integration of the rotational rates multiplied by the distance D or $r_D$ of the sensor apparatus 6 from the reference point P. The respective distance values $s_x$, $s_y$ and $s_z$ can therefore be calculated according to the embodiment in FIG. 4 as follows:

$$s_z = \int (r_D \cdot \omega_{ySensor} + \int a_{zSensor} dt) dt$$

$$s_y = \int (r_D \cdot \omega_{zSensor} + \int a_{ySensor} dt) dt$$

$$s_x = \int\int a_{xSensor} dt$$

If the sensor apparatus 6 does not lie in the sensor axis x, the respective rotational rate values $\omega_x$ must also be taken into account when determining the distance values $s_x$, $s_y$ and $s_z$, as is shown below by way of example for the distance value $s_z$:

$$s_z = \int (r_D \cdot \omega_{ySensor} + r_{D2} \cdot \omega_{xSensor} \int a_{zSensor} dt) dt$$

Figure 6:
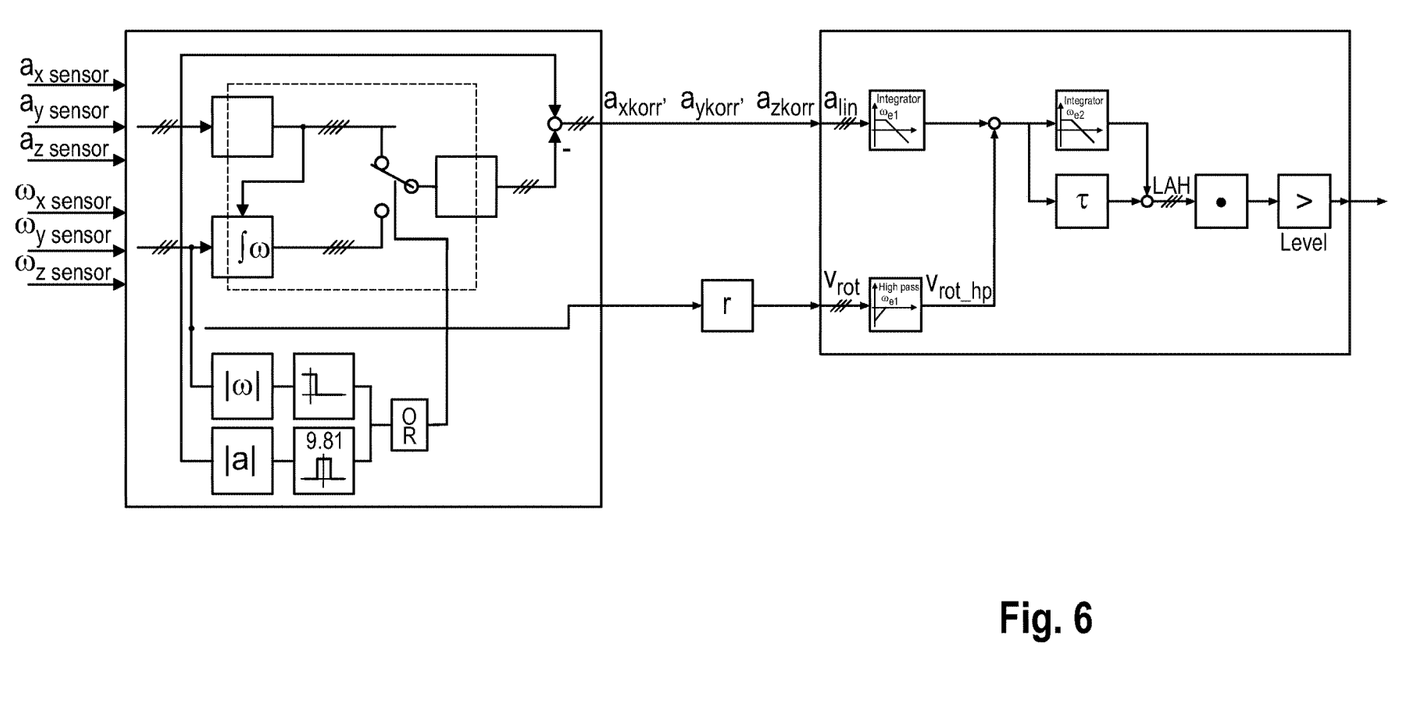
FIG. 6 is a flow chart for graphical representation of the method according to the invention.

The first, second and third rotational rate value $\omega_x$, $\omega_y$ and $\omega_z$ is multiplied, according to the diagram shown in FIG. 6, by the relevant distance value D or $r_D$ in order to determine a further speed value in the form of a fourth, fifth and sixth speed value. As already mentioned above, the relevant distance value D or $r_D$ corresponds to a distance between the sensor apparatus 6 and the reference point P in the relevant spatial direction x, y or z.

In a subsequent step, according to the diagram shown in FIG. 6, the further speed values which are determined from the rotational rate values $\omega_x$, $\omega_y$ and $\omega_z$ are added to the speed values which are determined from the acceleration values to form respective overall speed values and these are used to determine the distance values, as described in more detail above, in order to ascertain if the limit value has been exceeded.

In order to calculate the position of the hand-held machine tool 1 by the time $\tau$ in advance, the following calculations are carried out overall for the individual directions, for example:

$$s_z = \int (r_D \cdot \omega_{ySensor} + \int a_{zSensor} dt) dt + \tau (r_D \cdot \omega_{ySensor} + \int a_{zSensor} dt)$$

$$s_y = \int (r_D \cdot \omega_{zSensor} + \int a_{ySensor} dt) dt + \tau (r_D \cdot \omega_{zSensor} + \int a_{ySensor} dt)$$

$$s_x = \iint a_{xSensor} dt + \tau \cdot \int a_{xSensor} dt$$

In a further step, a total distance value is determined from the determined coordinates and this is compared with the defined limit value GW. If the total distance value is greater than the defined limit value GW and the reference point P at the current time added to the time constant τ would be outside the defined limit value GW, the drive is actively braked in the present case. Otherwise the operation continues unchanged.

When the hand-held machine tool 1 is in operation, i.e. during grinding, cutting, sawing, drilling or the like for example, disruptions, such as strong vibrations, can occur which can lead to unwanted switching-off of the hand-held machine tool 1. In order to be able to avoid this in a simple manner, the measured acceleration values are filtered. For example, a low-pass filter can be provided, with typical frequencies for low-pass filtering being between 0.1 Hz and 6 Hz, in particular approximately 1 Hz. In hand-held machine tools 1 which have in particular oscillating tools 3, such as saws, interference signals can have an influence on the rotational rate values, it being possible for said values to be filtered out using a low-pass or bandpass filter. The frequency of these filters is adapted to the frequency of the oscillating movement, such that said filters are damped to the desired extent.

In general, at least one rotational rate value $\omega_x$, $\omega_y$ and $\omega_z$ and/or at least one linear acceleration value $a_x$, $a_y$, $a_z$, $a_{xkorr}$, $a_{ykorr}$, $a_{zkorr}$ can be filtered in order to block frequency values which are below a predetermined frequency threshold value and/or above a further frequency threshold value. For example, this makes it possible for even minor movements of the hand-guided machine tool that are not caused by a stuck tool to be disregarded for the method.

The filter can be a high-pass filter, a low-pass filter or a band-limited filter. It has proven to be advantageous if a band-limited filter is used both for the acceleration values $a_x$, $a_y$, $a_z$ and for the speed values, the limit frequencies preferably being approximately 0.5 Hz and 10 Hz, in particular approximately 2.8 Hz. The values can be filtered in each case before or after the speed values generated from the linear acceleration values $a_x$, $a_y$, $a_z$ are combined with the speed values calculated from the rotational rate values $\omega_x$, $\omega_y$, and $\omega_z$. Particularly good results can be achieved if a band-limited filter is used for the linear acceleration values $a_x$, $a_y$, $a_z$ and a high-pass filter is used for the rotational rate values $\omega_x$, $\omega_y$ and $\omega_z$ or a band-limited filter of the speed values is used before or after a combination of the signals.

The invention claimed is:

1. A method for operating a hand-guided machine tool connectable to a tool, with a drive for driving the tool, a control device and at least one sensor being provided, the sensor having a distance from a reference point associated with the machine tool or the tool greater than or equal to zero, the method comprising the steps of:
   detecting at least one linear acceleration value ($a_x$, $a_y$, $a_z$) via the at least one sensor;
   subtracting a gravitational acceleration from the at least one linear acceleration value ($a_x$, $a_y$, $a_z$) to form at least one adjusted linear acceleration value ($a_{xkorr}$, $a_{ykorr}$, $a_{zkorr}$);
   integrating the at least one adjusted linear acceleration value ($a_{xkorr}$, $a_{ykorr}$, $a_{zkorr}$) into at least one speed value;
   integrating the at least one speed value into at least one distance value ($s_x$, $s_y$, $s_z$);
   multiplying the at least one speed value by a time constant (τ) to form at least one further distance value;
   adding the at least one distance value to the at least one further distance value to form at least one total distance value ($s_x$, $s_y$, $s_z$);
   filtering at least one of the linear acceleration values or adjusted linear acceleration values ($a_x$, $a_y$, $a_z$, $a_{xkorr}$, $a_{ykorr}$, $a_{zkorr}$) or at least one of the speed values;
   comparing the at least one total distance value ($s_x$, $s_y$, $s_z$) with a defined limit value; and
   initiating a predefined action when the at least one total distance value exceeds the defined limit value.

2. The method as recited in claim 1 further comprising determining at least one rotational rate value ($\omega_x$, $\omega_y$, $\omega_z$) from the at least one sensor, the rotational rate value ($\omega_x$, $\omega_y$, $\omega_z$) being multiplied by a value corresponding to the distance of the at least one sensor from the reference point, the determined rotational rate value being used to determine the total distance value ($s_x$, $s_y$, $s_z$).

3. The method as recited in claim 1 wherein the at least one sensor determines at least two linear acceleration values ($a_x$, $a_y$, $a_z$) of the at least one linear acceleration value or at least two rotational rate values ($\omega_x$, $\omega_y$, $\omega_z$) in at least two spatial directions.

4. The method as recited in claim 3 wherein the at least one sensor determines at least three linear acceleration values ($a_x$, $a_y$, $a_z$) of the at least one linear acceleration value or at least three rotational rate values ($\omega_x$, $\omega_y$, $\omega_z$) in at least three spatial directions.

5. The method as recited in claim 4 wherein an idle state of the machine tool in space is determined when a vector sum of the three linear acceleration values ($a_x$, $a_y$, $a_z$) is within a defined range.

6. The method as recited in claim 5 wherein the defined range is from 8 m/s² to 12 m/s².

7. The method as recited in claim 4 wherein an idle state of the machine tool is determined on the basis of the three rotational rate values ($\omega_x$, $\omega_y$, $\omega_z$).

8. The method as recited in claim 7 wherein the idle state being determined, when a dot product of the three rotational rate values ($\omega_x$, $\omega_y$, $\omega_z$) is less than a defined limit value of 4000 rad²/s².

9. The method as recited in claim 8 wherein the idle state being determined, when the dot product of the three rotational rate values ($\omega_x$, $\omega_y$, $\omega_z$) is less than a defined limit value of 2000 rad²/s².

10. The method as recited in claim 1 wherein a position of the machine tool when the machine tool is in motion is determined on the basis of adding integrated rotational rate signals to the position of the machine tool in an idle state.

11. The method as recited in claim 1 wherein the time constant (τ) has a value between 5 and 150 ms.

12. The method as recited in claim 11 wherein the time constant (τ) has a value of 70 ms.

13. The method as recited in claim 1 wherein the at least one rotational rate value ($\omega_x$, $\omega_y$, $\omega_z$) or the at least one linear acceleration value ($a_x$, $a_y$, $a_z$, $a_{xcorr}$, $a_{ykorr}$, $a_{zkorr}$) is filtered in order to block a frequency value below a predetermined frequency threshold value or above a further frequency threshold value.

14. The method as recited in claim 1 wherein the predefined action corresponds to switching off or actively braking the drive, sending out a warning signal or outputting a signal on a display apparatus.

15. The method as recited in claim 1 wherein the tool is a cutting disk and the method determines if the cutting disk is stuck in a material to be machined.

16. The method as recited in claim 1 wherein the distance from the reference point associated with the machine tool or the tool is greater than zero in a longitudinal direction of the hand-guided machine tool.

17. The method as recited in claim 1 wherein the distance from the reference point associated with the machine tool or the tool is zero.

18. A hand-held machine tool connectable to a tool, comprising:
- a drive for driving the tool;
- a control device; and
- at least one sensor having a distance from a reference point associated with the machine tool or the tool greater than or equal to zero, the hand-held machine tool operable to carry out the method as recited in claim 13.

19. The hand-held machine tool as recited in claim 18 further comprising at least one filter for blocking frequency values below a predetermined frequency threshold value or for blocking frequency values above a predetermined frequency threshold value is provided.

20. The hand-held machine tool as recited in claim 18 wherein the at least one sensor includes an acceleration sensor or a gyro sensor.

* * * * *

UNITED STATES PATENT AND TRADEMARK OFFICE
CERTIFICATE OF CORRECTION

| | |
|---|---|
| PATENT NO. | : 12,370,663 B2 |
| APPLICATION NO. | : 17/641537 |
| DATED | : July 29, 2025 |
| INVENTOR(S) | : Schaer et al. |

It is certified that error appears in the above-identified patent and that said Letters Patent is hereby corrected as shown below:

On the Title Page

Item (73) should read:
Hilti Aktiengesellschaft, Schaan (LI)

Signed and Sealed this
Twenty-sixth Day of August, 2025

Coke Morgan Stewart
*Acting Director of the United States Patent and Trademark Office*